March 31, 1970  A. H. JACOBSON ET AL  3,503,283
MACHINE TOOL

Filed March 4, 1968  5 Sheets-Sheet 1

INVENTORS
ALDEN H. JACOBSON
ALBERT L. LARSON
BY
ATTORNEYS

March 31, 1970   A. H. JACOBSON ET AL   3,503,283

MACHINE TOOL

Filed March 4, 1968   5 Sheets-Sheet 2

United States Patent Office 3,503,283
Patented Mar. 31, 1970

3,503,283
MACHINE TOOL
Alden H. Jacobson, Princeton, and Albert L. Larson, Holden, Mass., assignors to The Heald Machine Company, Worcester, Mass., a corporation of Delaware
Filed Mar. 4, 1968, Ser. No. 710,030
Int. Cl. B23b 39/00, 17/00; F16c 5/00
U.S. Cl. 77—1                                    9 Claims

ABSTRACT OF THE DISCLOSURE

This invention relates to a machine tool and, more particularly, to a horizontal boring machine or the like having a slidable table supported on flat ways and having guides separate from the ways.

BACKGROUND OF THE INVENTION

In the construction of a machine tool having a horizontally-slidable table, a number of problems have existed over the years. As long as the table travel is short, there are a few difficulties in supporting and guiding the table adequately. When the table travel is long, however, slight variations in way straightness are accentuated. Such a situation exists where the tool length (or hole length) is great or when it is desired to carry the workpiece first to tools at one end of the base (for finishing one side of the workpiece) and then to tools at the other end of the base (for finishing the other side of the workpiece). It has been the custom in the past to support the table on long rails or ways to produce relative movement between the tool and the workpiece over such long distances. The straightness of the path over which the table moves, therefore, is dependent, to a great extent, on the accuracy of the ways. Even if it were possible (at great expense) to manufacture these ways very accurately and to mount them on the base of the machine tool with the same degree of accuracy, nevertheless, as time goes on during everyday machining operations, the ways tend to vary from their original accuracy. This can come about because of blows or shocks to the machine tool during the machining operations or due to changes produced because of chips or dirt gaining access to the way surfaces. These problems of controlling the movement of the table along a straight path are accentuated when the machine tool is larger and the path is very long. This type of problem is particularly accentuated in the case of a large horizontal precision production boring machine. In such a machine tool where the tools are mounted on a bridge, the conventional constructions make it necessary to build the bridge high over the base, so that very large and heavy bridge constructions must be provided. These and other difficulties experienced with the prior art devices have been obviated in a novel manner by the present invention.

It is, therefore, an outstanding object of the invention to provide a machine tool having very long table motion in which the path of the table is very accurately determined in all planes.

Another object of this invention is the provision of a horizontal boring machine wherein motion in a horizontal plane is determined by very broad flat ways capable of carrying extremely heavy weights without loss of tracking ability.

A further object of the present invention is the provision of a horizontal boring machine having tool-supporting bridges at the end of an elongated base, wherein the bridges are relatively low in height and weight without loss of accuracy.

Another object of the invention is the provision of a machine tool having a long rectilinear table motion, wherein accuracy is obtained without the necessity of both male and female guides being long, i.e., one may be long and the other may be short.

With these and other objects in view, as will be apparent to those skilled in the art, the invention resides in the combination of parts set forth in the specification and covered by the claims appended hereto.

SUMMARY OF THE INVENTION

In general, the invention consists of a machine tool having an elongated base with flat ways extending lengthwise thereof, a table mounted on the ways for movement in a horizontal plane lengthwise of the base, and a bridge extending transversely over the base adjacent each end thereof. A guide means is associated with the central portion of each bridge and a tailpiece extends from each end of the table and slidably engaged with the guide means.

BRIEF DESCRIPTION OF THE DRAWINGS

The character of the invention, however, may be best understood by reference to one of its structural forms, as illustrated by the accompanying drawings, in which.

Figure 1:
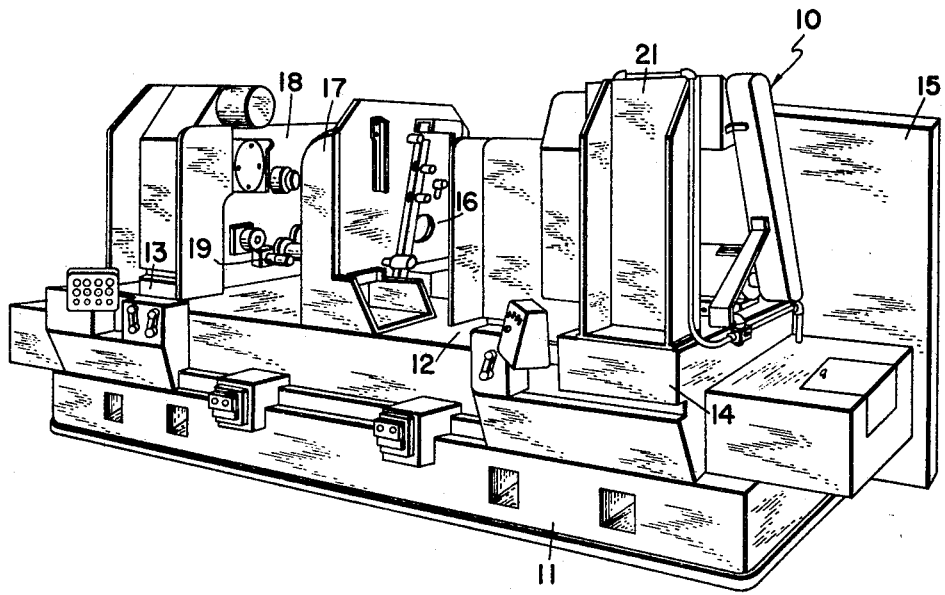
FIG. 1 is a perspective view of a machine tool embodying the principles of the present invention.
Figure 2:
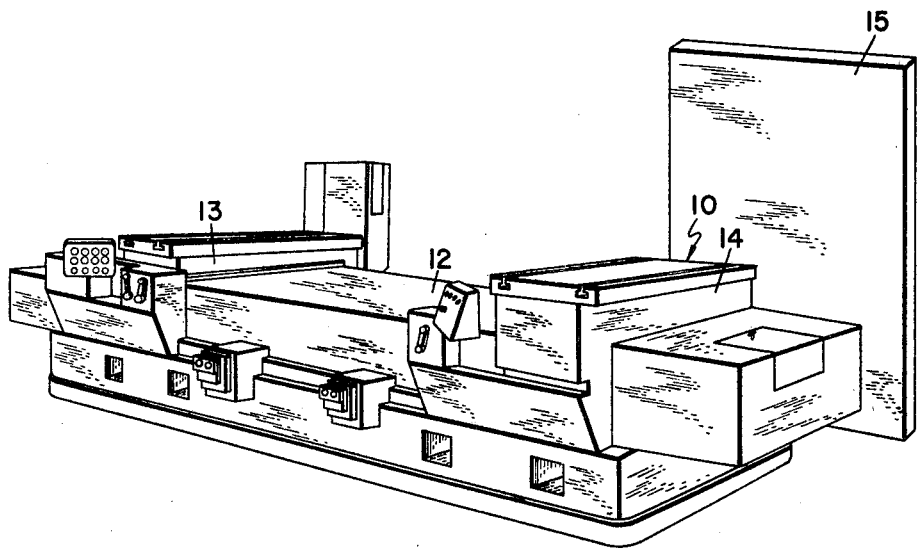
FIG. 2 is a perspective view of the invention with various accessories removed.
Figure 3:
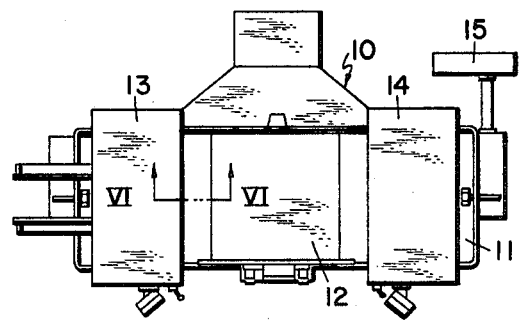
FIG. 3 is a plan view of the invention.
Figure 4:
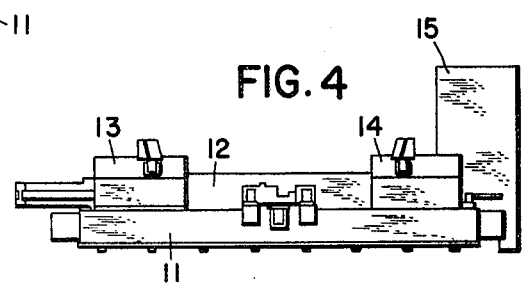
FIG. 4 is a front elevational view of the invention.
Figure 5:
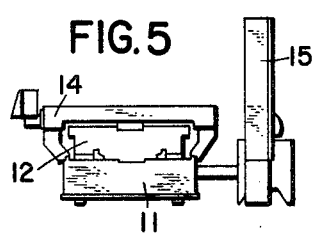
FIG. 5 is a right-end elevational view of the invention.

Referring first to FIGS. 1 through 5, wherein are best shown the general features of the invention, the machine tool, indicated generally by the reference numeral 10, is shown for the purposes of illustration as a horizontal boring machine. The machine tool is provided with an elongated base 11 on which is slidably mounted a table 12. At the left end of the base it is provided with a bridge 13, while the right end carries another bridge 14. At the back of the machine is mounted a control box 15. The machine tool is shown in FIG. 1 in use in finishing a workpiece 16 mounted in fixture 17 which, in turn, is mounted on the table 12; in the same figure the bridge 13 carries tooling apparatus 18 including, for example, a boring head 19. A similar tooling apparatus 21 is mounted on the bridge 14.

Figure 6:
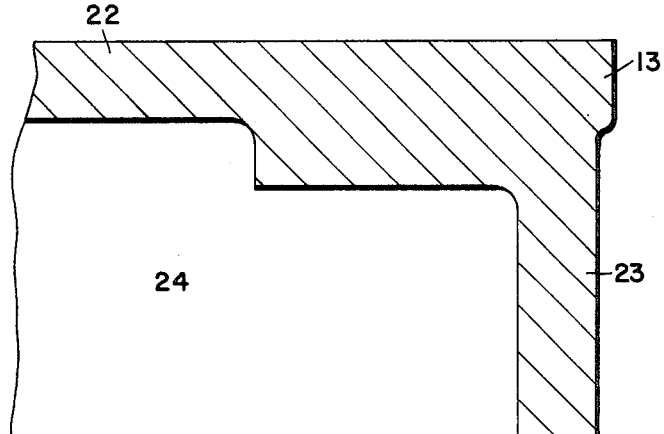
FIG. 6 is a vertical sectional view of a portion of the invention taken on the line VI—VI of FIG. 3.
Figure 6:
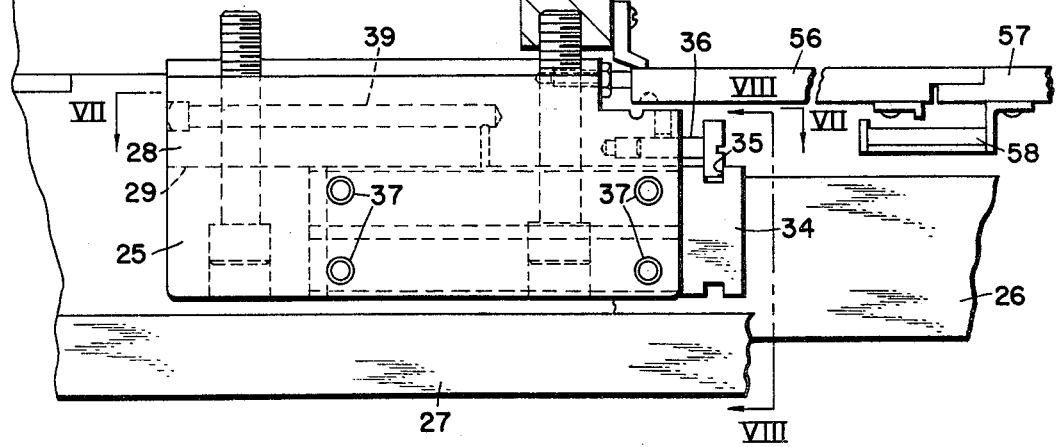
Figure 7:
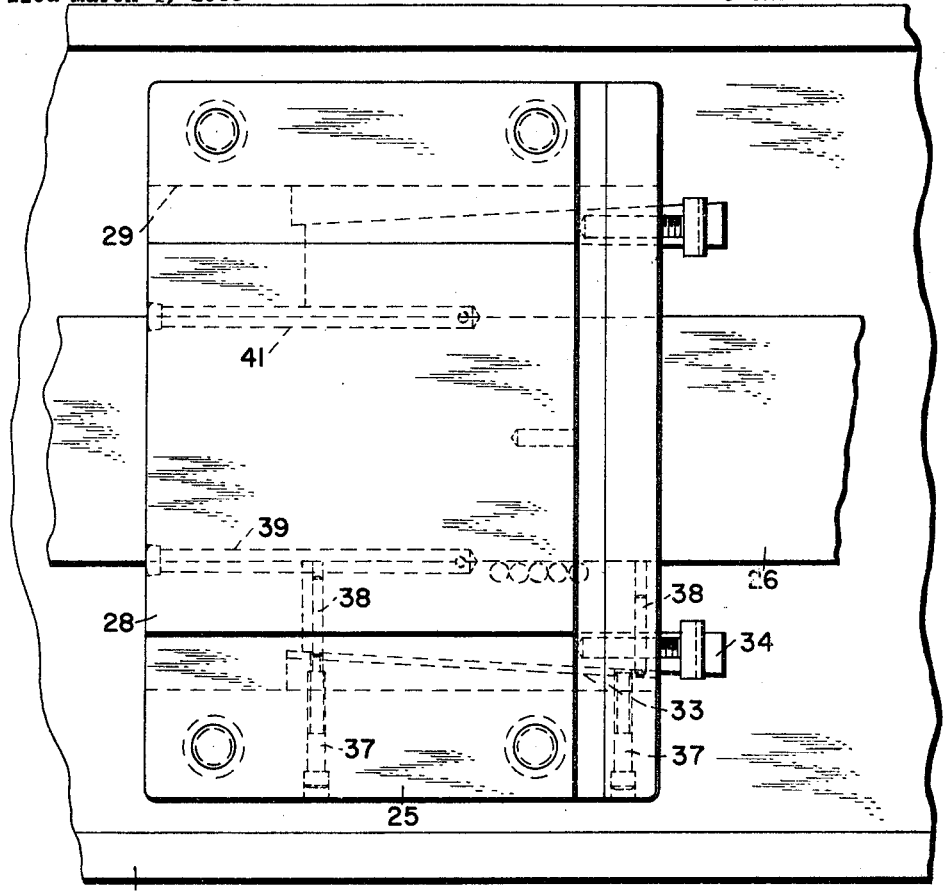
FIG. 7 is a horizontal sectional view taken on the line VII—VII of FIG. 6.
Figure 8:
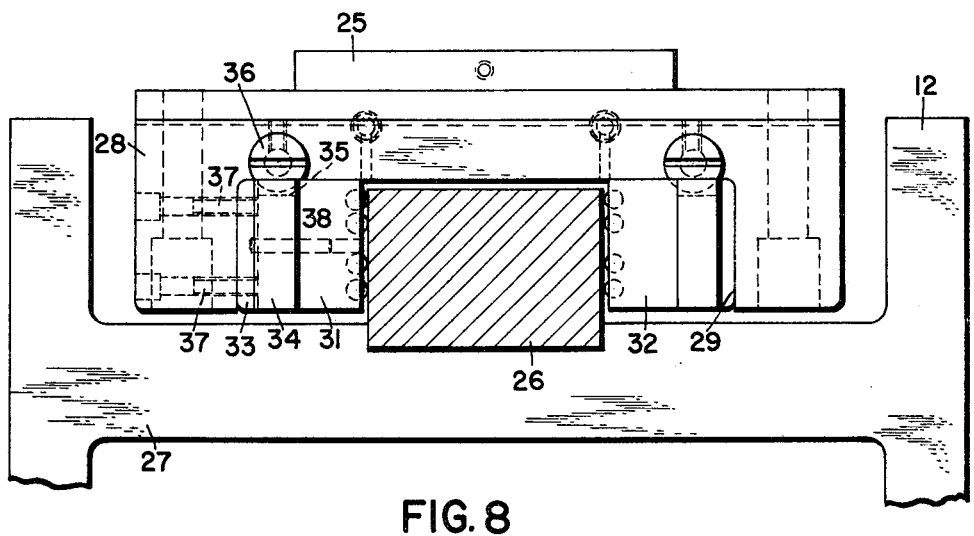
FIG. 8 is a vertical sectional view of the invention taken on the line VIII—VIII of FIG. 6.

Referring now to FIGS. 6, 7, and 8, the bridge 13 is shown as having an upper plate 22 to which tooling apparatus is attached. From the inner edge of this plate extends an integral transverse flange 23. For the purpose of this description, the expression "longitudinal" is intended to mean a direction lengthwise of the base 11, while the expression "transverse" is to mean a direction at a right angle to the length of the base. A longitudinal web 24 extends from the flange 23 under the plate 22 in the center portion of the bridge. Hanging downwardly from the bridge and fastened to the flange 23 and the web 24 is a guide 25. Through the guide passes a bar 26 of rectangular cross-section forming part of the table 12. The bar, in turn, is attached to a horizontal web of a large channel beam 27 of H-form cross-section which acts as the main structural member of the table. The guide 25 is provided with a main block 28 formed with a downwardly-directed longitudinal slot 29. In the slot are located two bearing members 31 and 32, one on each side of the bar 26. Each bearing member is provided with a linear ball bearing of the well-known type, wherein the balls roll in an endless path in and out of the area of contact with the vertical surfaces of the bar 26. Between the bearing member 31 and the adjacent vertical surface of the slot 29 is mounted complementary adjusting wedges 33 and 34. As is evident in FIG. 6, the end of the wedge 34 protrudes from the slot 29 and is provided with a transverse slot 35 in which resides the large head of a bolt 36 which is threadedly engaged with the main block 28 of the guide 25. Rotation of the bolt produces longitudinal movement of the wedge 33 to move the bearing member 31 laterally to provide takeup of any slack around the bar in the guide. Laterally-extending bolts 37 on the wedge are threaded into bores in the main block 28 to prevent longitudinal movement of that wedge relative to the block. Similar pins 38 are mounted in the wedge 34 and slide into bores in the bearing member 31 to inhibit longitudinal relative motion between that wedge and the bearing member. Similar wedges and their adjusting elements are mounted in the slot 29 between the bearing member 32 and the adjacent vertical surface of the slot. Lubrication passages 39 and 41 are provided through the main block to take care of the bearing surfaces between the bar 26 and the bearing members 31 and 32.

Figure 9:
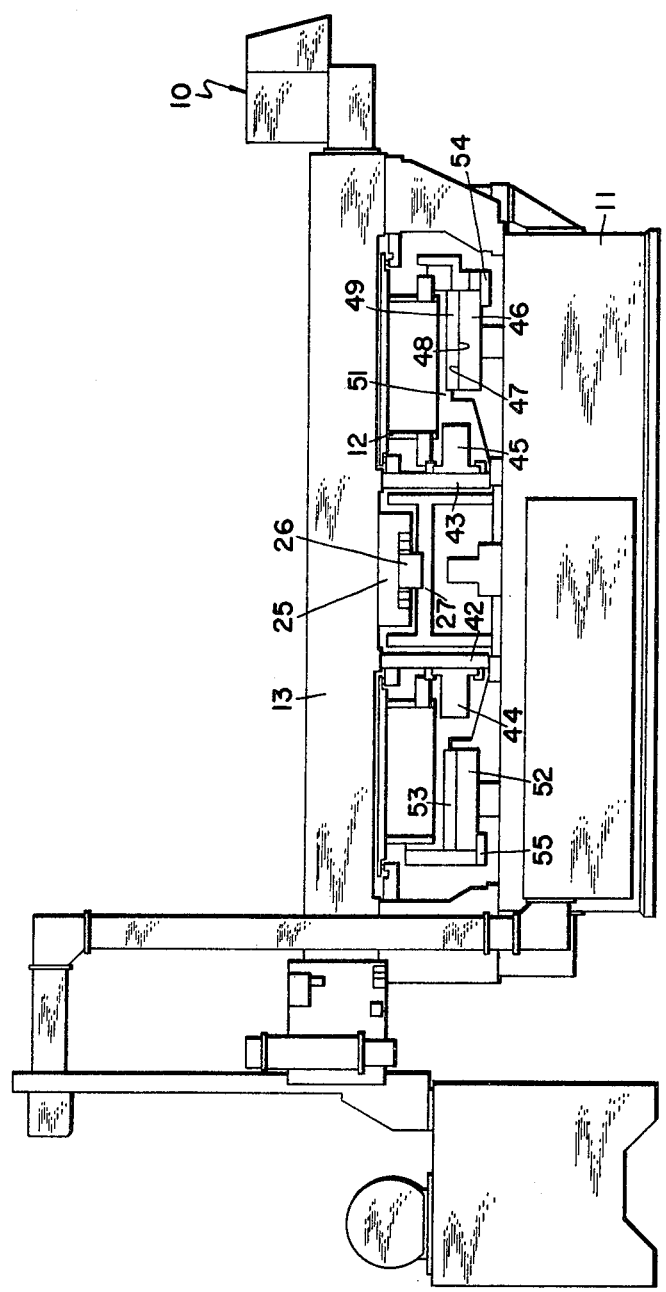
FIG. 9 is a view from the left end of the machine tool.

FIG. 9 shows the manner in which the table 12 is supported and guided on the base 11. The bridge 13 is supported not only at its ends, but by intermediate walls 42 and 43 on the side of which are mounted the hydraulic table actuators 44 and 45. The beam 27 extends from the table into the space between the walls 42 and 43 and, of course, the guide 25 extends downwardly from the bridge into the space between the vertical flanges of the beam and just above the web. The front (right side in FIG. 9) of the base 11 is provided with a way 46 having a flat horizontal upper surface 47 which mates with a correspondingly flat horizontal surface 48 which represents the bottom surface of a way 49. This way is fastened to an understructure 51 which forms part of the table. A similar set of flat horizontal ways 52 and 53 are provided at the back portion of the bed 11 to support the back of the table. A hold-down plate 54 extends from the table 12 to the underside of the way 46 to prevent lifting of the table and a similar plate 55 is associated with the back way 52.

The top of the table is provided with various plates to prevent coolant fluid and chips from falling into the table ways and guides; the plates are associated with baffles and seals to increase the effectiveness of this function. In FIG. 6, for instance, the plates 56 and 57 have a joint under which is mounted a transverse trough 58.

Figure 10:
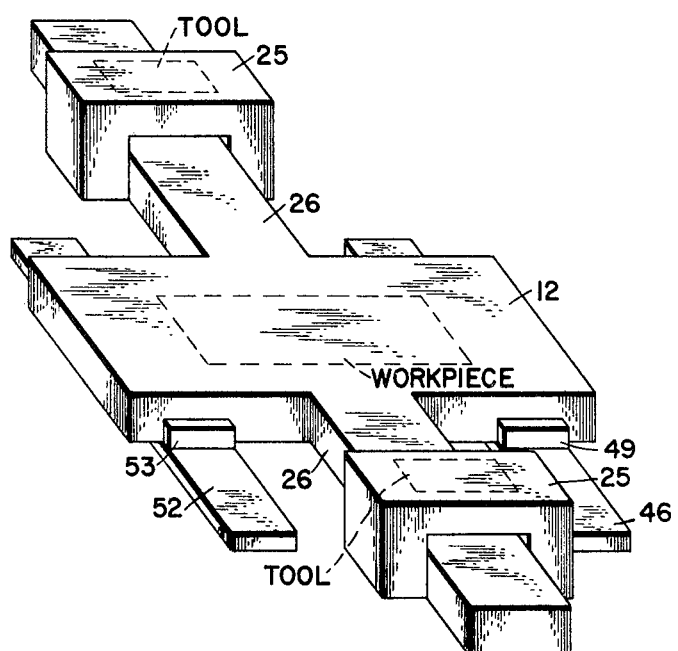
FIG. 10 is a schematic illustration of the invention.

FIG. 10 illustrates in a simple manner the way in which the invention operates. Assuming that the workpiece is mounted (perhaps through the medium of a fixture) on the table and the tools are associated with the guides (through the bridge, not shown), the table slides lengthwise to bring the workpiece into operative contact with the tool at one end or the other of the base. The engagement of the vertical sides of the bar 26 is guided by the bearing members of the guides 25; there is no other restriction to the lateral movement of the table. Because these guides are not called upon to carry any weight of the table, fixture, and workpiece. On the other hand, the ways 49 and 53 make sliding contact with the bed or base ways 46 and 52, respectively, and are not restricted in a vertical direction by any other elements. In other words, all lateral restriction is in the guides and bar, while all vertical restriction is in the flat ways. This means that the accuracy of "tracking" of the table motion can be built into the machine and maintained, because the elements are so simple and can be constructed so ruggedly at relatively little cost. Furthermore, the invention gives strength and rigidity even in extreme conditions. For instance, if the tool which is operating on the workpiece is located a great distance from the centerline of the machine, large force couples exist about a vertical axis. These moments or couples tend to rotate the table so that the path of the tool through the workpiece is not parallel to the path of a similar operation performed on the centerline where the machining operation does not produce a force couple. With the use of the present invention, however, the force couple exists, of course, but the bar 26 at the other end of the table acts as a "tail" which cooperates with the guide 25 to resist any tendency of the table to turn.

By the use of the present invention, it is possible to use the intermediate support walls 42 and 43 in the bridge. The bridge can, therefore, be built of lighter construction or the cross-plate can be thinner, so that the tools can be located closer to the table way level. Furthermore, the particular structure of the invention allows a lower bridge because the table thickness is less. The advantage of the lower bridge and the lower tool is that the workpiece can also be mounted closer to the table; therefore, the bending of the workpiece and fixture is less.

It can be seen, then, that the ability of the machine tool to resist table turning or "fishtailing" due to offset machining forces and its ability to use lower bridges is particularly useful where the machine tool is long. A long machine of this kind is necessary where the operations are to be performed on opposite sides of a workpiece that has a large dimension in the "longitudinal" direction. It is also necessary where the tool must be long, as where the tool produces a very deep hole. In both cases, in the past, considerable difficulty has been experienced in producing bores and the like whose axes are parallel. By use of the present invention, it has been possible to perform operations on both sides of a workpiece and at widely-spaced points whose axes are accurately parallel.

In a commercial embodiment of the invention, it has been possible to make a large horizontal precision production boring machine which weighed 50 tons and can carry up to 5000 pounds on the table, yet which tracks within .0001 inch in 50 inches of table travel. The bridges were 76 inches wide, so that they provided substantial capacity for a wide variety of multiple operation setups using standard boringheads or special cluster heads. The unique table construction permitted these bridges to be firmly supported at intermediate positions as well as at both ends. This permits a more stable bridge with minimum thickness, thus allowing the tool spindles to be mounted closer to the table. It is possible to use this machine tool for boring, facing, turning, grooving, and chamfering operations, either singly or in combination; the operations can be performed simultaneously or in sequence, depending upon the configuration of the workpiece.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine tool, comprising
 (a) an elongated base having flat ways, extending lengthwise thereof,
 (b) a table mounted on the ways for movement in a horizontal plane lengthwise of the base,
 (c) a bridge extending transversely over the base adjacent each end thereof,
 (d) a guide associated with the central portion of each bridge, and
 (e) a tailpiece extending from each end of the table and slidably engaged with one of the guides.

2. A machine tool as recited in claim 1, wherein the flat ways are spaced and parallel and are located on either side of an imaginary line joining the guides.

3. A machine tool as recited in claim 1, wherein the guides do not inhibit vertical motion of the table, while the ways do not inhibit horizontal motion.

4. A machine tool as recited in claim 1, wherein each bridge consists of a horizontal plate supported in spaced parallel relationship to the table, the support being provided at the ends and in the middle on either side of the guide.

5. A machine tool as recited in claim 4, wherein the guide is supported in dependent position on the bridge.

6. A machine tool as recited in claim 5, wherein the tailpiece includes an H-shaped beam whose web is horizontal and whose flanges extend vertically on either side of the guide, and wherein a rectangular bar is mounted on the upper surface of the web for engagement with the guide.

7. A machine tool as recited in claim 6, wherein the guide consists of a block having a downwardly-directed longitudinal slot which envelopes the bar and wherein bearing members having linear ball bearings are mounted in the slot for engagement with opposite vertical sides of the bar.

8. A machine tool as recited in claim 7, wherein wedge means is mounted in the slot to permit adjustment of the bearing members laterally within the slot.

9. A machine tool as recited in claim 6, wherein a single integral beam extends longitudinally of the table to serve as an element of both tailpieces, and wherein a support structure extends laterally of the beam on both sides to make contact with the ways.

References Cited

UNITED STATES PATENTS

| | | | |
|---|---|---|---|
| 3,183,782 | 5/1965 | Mills | 90—58 |
| 3,350,143 | 10/1967 | Lichowsky | 308—3 |
| 3,389,625 | 6/1968 | Wagner | 308—3 |

GERALD A. DOST, Primary Examiner

U.S. Cl. X.R.

82—32; 90—58; 308—3